Patented Apr. 21, 1925.

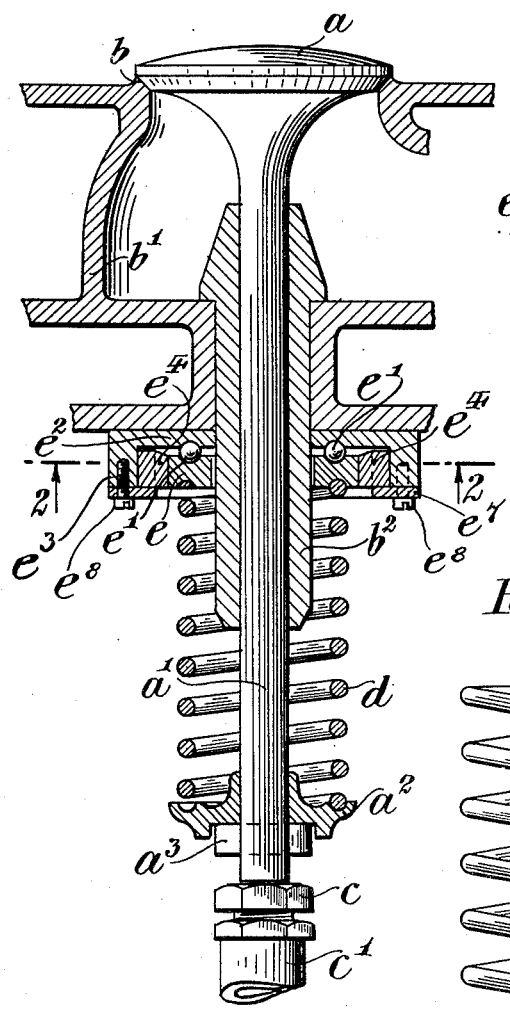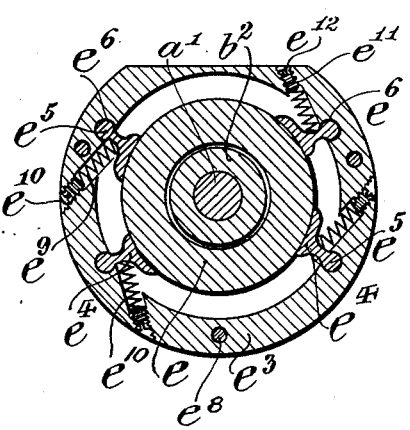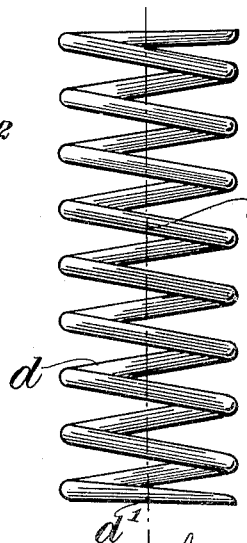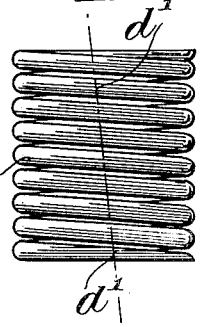

1,534,476

UNITED STATES PATENT OFFICE.

GOTTFRIED WIRRER, OF PLAINFIELD, NEW JERSEY, ASSIGNOR TO INTERNATIONAL MOTOR COMPANY, OF NEW YORK, N. Y., A CORPORATION OF DELAWARE.

ROTATING POPPET VALVE.

Application filed July 27, 1923. Serial No. 654,098.

*To all whom it may concern:*

Be it known that I, GOTTFRIED WIRRER, a citizen of the Swiss Republic, residing in the city of Plainfield, in the State of New Jersey, have invented certain new and useful Improvements in Rotating Poppet Valves, of which the following is a specification, reference being had to the accompanying drawing, forming a part hereof.

This invention relates to valves for internal combustion engines and more particularly to poppet valves which are adapted to be rotated somewhat during each operation thereof. It is desirable to rotate poppet valves during their operation to bring new portions of the engaging surfaces of the valves and valve seat in contact in order to equalize their wear and to eliminate carbon deposits therebetween which cause pitting of the surfaces and prevent a tight closing of the valve. It has been proposed, heretofore, to cause the rotation of poppet valves during their operation by means of pawl and ratchet mechanisms or cams and spiral sleeves but such instrumentalities are not satisfactory in practice because they add considerable weight to the reciprocating parts and are subject to rapid wear. The usual poppet valve is provided with a spring tending to hold the valve upon its seat and against the action of which the valve is reciprocated. It is an object of the present invention to take advantage of certain forces naturally resulting from the compression and release of the valve spring to cause the rotation of the valve on its seat. Accordingly the valve spring is retained between a fixed seat and a seat freely revoluble in one direction, one of the seats being carried with the valve stem and the other with a stationary part of the engine. The spring is so interposed between the seats that when the valve is lifted off its seat, that part of the spring which engages the revoluble seat will rotate a certain amount therewith due to the fact that the revoluble seat is subjected to fewer retarding forces than exist between the valve lifter and valve stem and the valve stem and guide. When the valve returns to its seat and the valve spring is relieved of compression, the spring has a tendency to rotate in the opposite direction. As the revoluble seat is unable to turn in the opposite direction the spring impresses forces in opposite directions, in the manner of a couple upon the two seats thereby rotating the valve slightly.

A preferred embodiment of the invention will now be described more fully with reference to the accompanying drawings, in which:

Figure 1 is a view in longitudinal section of a conventional type of poppet valve to which the valve turning mechanism is applied.

Figure 2 is a view of the revolvable seat and the means permitting it to rotate in only one direction, taken in the plane indicated by the line 2—2 in Fig. 1 and looking in the direction of the arrows.

Figure 3 is a view of the valve spring in normal extended condition.

Figure 4 is a view of the valve spring when compressed.

In Figure 1 the valve $a$ is shown on its seat $b$ in cylinder $b'$, the valve stem $a'$ being shown extending through guide $b^2$ and engaged by the adjustable valve lifter screw $c$ forming a part of valve lifter $c'$. The valve is held on its seat by means of valve spring $d$, which rests at one end on the valve spring washer $a^2$ fixed to the valve stem by key $a^3$. The other end of the spring engages a revoluble ball race $e$ of a thrust bearing comprising ball race $e$, balls $e'$ and a stationary ball race $e^2$ secured in any convenient manner to cylinder $b'$. The stationary ball race is formed with a depending flange $e^3$ surrounding the ball race $e$ and spaced therefrom to permit the interposition of friction pawls $e^4$ having arms $e^5$ fitting loosely in recesses $e^6$ formed in the inner wall of the flange. The pawls are retained in position by means of retaining ring $e^7$ secured as by screws $c^8$ to the flange and are designed to engage the ball race $e$ under the action of springs $e^9$ to prevent its rotation in one direction while allowing it to rotate freely in the opposite direction. The springs $e^9$ are mounted in threaded bores $e^{10}$ and are retained under the desired tension by screw plugs $e^{11}$ slotted as at $e^{12}$ to permit their adjustment in the bores by the blade of a screw driver or the like.

It has been found that when a coil spring is compressed or permitted to extend, both ends being free, the coils change their relative positions. This will be plain upon reference to Figures 3 and 4. Figure 3 illustrates a spring in normal extended position and is shown as bearing upon adjacent coils a series of marks $d'$ in a line parallel with the axis of the coil. When the spring is compressed the markings $d'$, instead of being in a line parallel with the coil axis will be displaced therefrom and lie substantially in a line at an angle to the axis of the coil, as illustrated in Figure 4. If one end of the spring is held stationary it will be obvious that the opposite end will rotate and will impress a turning moment upon whatever it is in engagement with. Advantage is taken of this spring action to cause the intermittent rotation of the poppet valve on its seat. When valve $a$ is lifted and spring $d$ placed under compression between seats $a^2$ and $e$, the coils of the spring will have a tendency to alter their relative positions as just explained. As the lower end of the spring $d$ is in frictional engagement with washer $a^2$ and because of the friction existing between the cooperating surface of the valve lifter and valve, and valve stem and guide, the lower end of the coil is held stationary, while the upper end will impress a turning moment upon the ball race $e$ and rotate the same. When the valve returns to its seat and the valve spring is relieved of compression, the spring has a tendency to rotate the ball race $e$ in the opposite direction. The ball race is prevented, however, from rotating in the opposite direction by the friction pawls. Therefore, the lower end of the spring will tend to rotate the washer $a^2$ and as the forces preventing the rotation of ball race $e$ are greater than the frictional forces between the valve stem and guide, the washer $a^2$ will be rotated and the valve will be turned slightly on its seat bringing new points on the engaging surfaces in contact and wiping off all carbon deposits.

It will be apparent to those skilled in the art that the invention is not confined to the specific form and arrangement of valve mechanism illustrated nor the particular means used for producing a spring seat revoluble in only one direction, but various changes may be made in these features as well as in the relative positions of the spring seats with respect to the valve stem and engine cylinder without departing from the spirit and scope of the invention.

What I claim is:—

In an internal combustion engine, a valve having a valve stem, a spiral valve spring surrounding the valve stem, a spring seat fixed adjacent the end of the valve stem and engaged by an end of the valve spring, a thrust ball race engaged by the other end of the spring, a ball race secured to the engine cylinder, balls between said ball races, spring pressed pawls carried with the stationary ball race and engaging the movable ball race and means for reciprocating the valve.

This specification signed this 24th day of July A. D. 1923.

GOTTFRIED WIRRER.